(12) United States Patent
Oda et al.

(10) Patent No.: US 9,884,567 B2
(45) Date of Patent: Feb. 6, 2018

(54) VEHICLE INCLUDING FUEL CELL SYSTEM

(71) Applicant: TOYOTA JIDOSHA KABUSHIKI KAISHA, Toyota-shi, Aichi-ken (JP)

(72) Inventors: Kohei Oda, Toyota (JP); Kenji Umayahara, Miyoshi (JP); Yuji Kakeno, Nisshin (JP); Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 157 days.

(21) Appl. No.: 14/939,598

(22) Filed: Nov. 12, 2015

(65) Prior Publication Data
US 2016/0137096 A1    May 19, 2016

(30) Foreign Application Priority Data
Nov. 15, 2014  (JP) ................. 2014-232253

(51) Int. Cl.
*H01M 8/04*      (2016.01)
*B60L 11/18*    (2006.01)
(Continued)

(52) U.S. Cl.
CPC .......... *B60L 11/1883* (2013.01); *B60L 1/003* (2013.01); *B60L 3/0053* (2013.01); *B60L 11/1803* (2013.01); *B60L 11/1898* (2013.01); *B60L 15/20* (2013.01); *H01M 8/0438* (2013.01); *H01M 8/04089* (2013.01); *H01M 8/04111* (2013.01); *H01M 8/04746* (2013.01); *H01M 8/04753* (2013.01); *H01M 8/04992* (2013.01);
(Continued)

(58) Field of Classification Search
None
See application file for complete search history.

(56) References Cited

U.S. PATENT DOCUMENTS 5,646,852 A    7/1997 Lorenz et al.
2003/0022034 A1*  1/2003 Suzuki ............. H01M 8/04089
                                          429/443
(Continued)

FOREIGN PATENT DOCUMENTS

CN      102458911 A    5/2012
JP    2004-152679 A    5/2004
(Continued)

*Primary Examiner* — Thomas G Black
*Assistant Examiner* — Demetra Smith-Stewart
(74) *Attorney, Agent, or Firm* — Finnegan, Henderson, Farabow, Garrett & Dunner, LLP

(57) ABSTRACT

In a vehicle including a fuel cell system, an electronic control unit is configured to perform first processing in which a rotation speed of an air pump is controlled based on a torque command value and a rotation speed command value, and to perform, in the first processing, at least one of second processing in which the torque command value is set to be larger than the calculated torque command value when at least one of values of an accelerator position, required electric power, and the rotation speed command value or a change rate thereof is increased by a prescribed first value or more, and third processing in which the torque command value is set to be smaller than the calculated torque command value when at least one of the values or the change rate thereof is decreased by a prescribed second value or more.

7 Claims, 8 Drawing Sheets

(51) Int. Cl.
    *B60L 15/20*     (2006.01)
    *B60L 1/00*      (2006.01)
    *B60L 3/00*      (2006.01)
    *H01M 8/04089*   (2016.01)
    *H01M 8/0438*    (2016.01)
    *H01M 8/04746*   (2016.01)
    *H01M 8/04111*   (2016.01)
    *H01M 8/04992*   (2016.01)

(52) U.S. Cl.
    CPC ....... *B60L 2240/80* (2013.01); *B60L 2250/28* (2013.01); *B60L 2260/44* (2013.01); *B60L 2270/145* (2013.01); *H01M 2250/20* (2013.01); *Y02T 10/7258* (2013.01); *Y02T 90/32* (2013.01); *Y02T 90/34* (2013.01)

(56) References Cited

U.S. PATENT DOCUMENTS

| | | | |
|---|---|---|---|
| 2003/0194586 A1* | 10/2003 | Sugiura | H01M 8/04626 429/429 |
| 2008/0090110 A1* | 4/2008 | Kizaki | H01M 8/04186 429/415 |
| 2009/0033302 A1 | 2/2009 | Hariu | |
| 2009/0105895 A1* | 4/2009 | Shige | B60L 11/1881 701/22 |
| 2010/0047646 A1 | 2/2010 | Kitamura | |
| 2010/0082189 A1* | 4/2010 | Xu | B60L 15/20 701/22 |
| 2010/0222950 A1* | 9/2010 | Ueoka | B60W 50/10 701/22 |
| 2011/0003223 A1 | 1/2011 | Saeki | |
| 2012/0095637 A1 | 4/2012 | Katano | |
| 2012/0225329 A1* | 9/2012 | Kazuno | H01M 8/04873 429/9 |
| 2013/0164647 A1* | 6/2013 | Kobayashi | F04D 13/0606 429/434 |

FOREIGN PATENT DOCUMENTS

| | | |
|---|---|---|
| JP | 2006-353032 | 12/2006 |
| JP | 2011-003278 A | 1/2011 |
| JP | 2011-015551 A | 1/2011 |
| JP | 2011-019314 A | 1/2011 |
| JP | 2011-142033 A | 7/2011 |
| JP | 2011-211770 | 10/2011 |
| KR | 10-2013-0046820 A | 5/2013 |
| WO | WO 2010/146421 A2 | 12/2010 |

\* cited by examiner

VEHICLE INCLUDING FUEL CELL SYSTEM

INCORPORATION BY REFERENCE

The disclosure of Japanese Patent Application No. 2014-232253 filed on Nov. 15, 2014 including the specification, drawings and abstract is incorporated herein by reference in its entirety.

BACKGROUND OF THE INVENTION

1. Field of the Invention

The invention relates to a vehicle including a fuel cell system.

2. Description of Related Art

Japanese Patent Application Publication No. 2011-211770 (JP 2011-211770 A) discloses a fuel cell system in which a flow rate of air to be supplied to a fuel cell is calculated in accordance with electric power required of the fuel cell, a target rotation speed of an air compressor to supply the air is calculated, and a torque to be given to the air compressor is regulated to control a rotation speed of the air compressor to the target rotation speed. Note that when output electric power of the fuel cell is smaller than the required electric power, a secondary battery compensates for the shortage of the required electric power.

However, when the electric power required of the fuel cell is rapidly changed, the response of the air compressor (generally, an air pump) is low and thus an actual rotation speed of the air compressor may not be able to reach a required rotation speed sufficiently promptly.

SUMMARY OF THE INVENTION

An aspect of the invention provides a vehicle including a fuel cell system. The vehicle includes a fuel cell; an air pump that supplies an oxidant gas to the fuel cell; an accelerator position sensor that detects an accelerator position of the vehicle; and an electronic control unit configured to control the fuel cell system. The electronic control unit is configured to perform first processing in which required electric power is calculated from the accelerator position detected by the accelerator position sensor, a flow rate of the oxidant gas to be supplied to the fuel cell is calculated in accordance with the required electric power, a rotation speed command value for the air pump is calculated using a value of the calculated flow rate, a torque command value for the air pump is calculated using the rotation speed command value and a current rotation speed of the air pump, and the rotation speed of the air pump is controlled based on the torque command value and the rotation speed command value. The electronic control unit is configured to perform, in the first processing, at least one of second processing in which the torque command value used to control the air pump is set to be larger than the calculated torque command value to control the rotation speed of the air pump when at least one of values of the accelerator position, the required electric power, and the rotation speed command value or a change rate of at least one of the values is increased by a prescribed first value or more, and third processing in which the torque command value used to control the air pump is set to be smaller than the calculated torque command value to control the rotation speed of the air pump when at least one of the values of the accelerator position, the required electric power, and the rotation speed command value or the change rate of at least one of the values is decreased by a prescribed second value or more. In this aspect, when at least one of the values of the accelerator position, the required electric power, and the rotation speed command value or a change rate of one of the values is changed by the prescribed value or more, the torque command value used to control the air pump is adjusted accordingly. Therefore, the response of the air pump can be improved.

(2) In the vehicle according to the above-mentioned aspect, the electronic control unit may be configured to perform the first processing without performing the second processing when an actual rotation speed of the air pump reaches a rotation speed lower than the rotation speed command value by a prescribed first rotation speed in the second processing, and to perform the first processing without performing the third processing when the actual rotation speed of the air pump reaches a rotation speed higher than the rotation speed command value by a prescribed second rotation speed in the third processing. With this configuration, the rotation speed of the air pump can be prevented from overshooting (becoming higher than) the rotation speed command value when the rotation speed is being increased or the rotation speed of the air pump can be prevented from undershooting (becoming lower than) the rotation speed command value when the rotation speed is being decreased.

(3) In the vehicle according to the above-mentioned aspect, the electronic control unit may be configured to calculate an estimated value of the rotation speed command value from an amount of decrease in the accelerator position, to calculate a feed-forward value of a torque of the air pump using the estimated value, and to set a value lower than the feed-forward value as the torque command value, when the accelerator position is decreased and before the rotation speed command value for the air pump is obtained in the third processing. With this configuration, the torque command value can be calculated without obtaining the rotation speed command value for the air pump when the accelerator position is decreased. Therefore, the response of the rotation speed of the air pump can be improved.

(4) In the vehicle according to the above-mentioned aspect, the electronic control unit may be configured to decrease a torque of the air pump by a prescribed value from a feed-forward value of the torque of the air pump in the third processing, the feed forward value being calculated based on an amount of decrease in the accelerator position. With this configuration, the response of the rotation speed of the air pump can be improved when the accelerator position is decreased.

(5) In the vehicle according to the above-mentioned aspect, the electronic control unit may be configured to set a lower limit value of the torque command value in accordance with an actual rotation speed of the air pump. When the rotation speed of the air pump is decreased, the torque command value becomes negative. With the above-mentioned configuration, the reverse rotation of the air pump can be prevented.

(6) In the vehicle according to the above-mentioned aspect, the electronic control unit may be configured to set the torque command value at zero when the accelerator position is decreased and the required electric power that is required of the fuel cell and that is calculated from the accelerator position is larger than output electric power of the fuel cell. With this configuration, the excessive restriction of the output of the fuel cell can be prevented.

(7) In the vehicle according to the above-mentioned aspect, the electronic control unit may be configured to perform the first processing without performing the third processing when the accelerator position is decreased and the required electric power that is required of the fuel cell and that is calculated from the accelerator position is larger than output electric power of the fuel cell. With this configuration, feedback control in the first processing can be performed when the required electric power that is required of the fuel cell is larger than output electric power of the fuel cell.

(8) In the vehicle according to the above-mentioned aspect, an upper limit threshold value of the rotation speed command value may be provided, the upper limit threshold value being smaller than an allowable rotation speed of the air pump; and the electronic control unit may be configured, when the rotation speed of the air pump exceeds the upper limit threshold value during the first processing, to calculate a torque coefficient based on a difference between an actual rotation speed of the air pump and the upper limit threshold value, to use the torque command value calculated in the first processing as a base torque command value, to multiply the base torque command value by the torque coefficient to calculate a new torque command value, and to control the rotation speed of the air pump based on the new torque command value and the rotation speed command value, the torque coefficient being equal to or less than 1 and becoming smaller as the difference becomes larger. With this configuration, the torque command value becomes small when the rotation speed of the air pump exceeds the upper limit threshold value. Therefore, hunting of the rotation speed of the air pump and the torque command value for the air pump can be prevented.

The invention can be realized in various aspects. The invention can be realized as, for example, a fuel cell system, a method for controlling a fuel cell system, or the like, in addition to a vehicle including a fuel cell system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
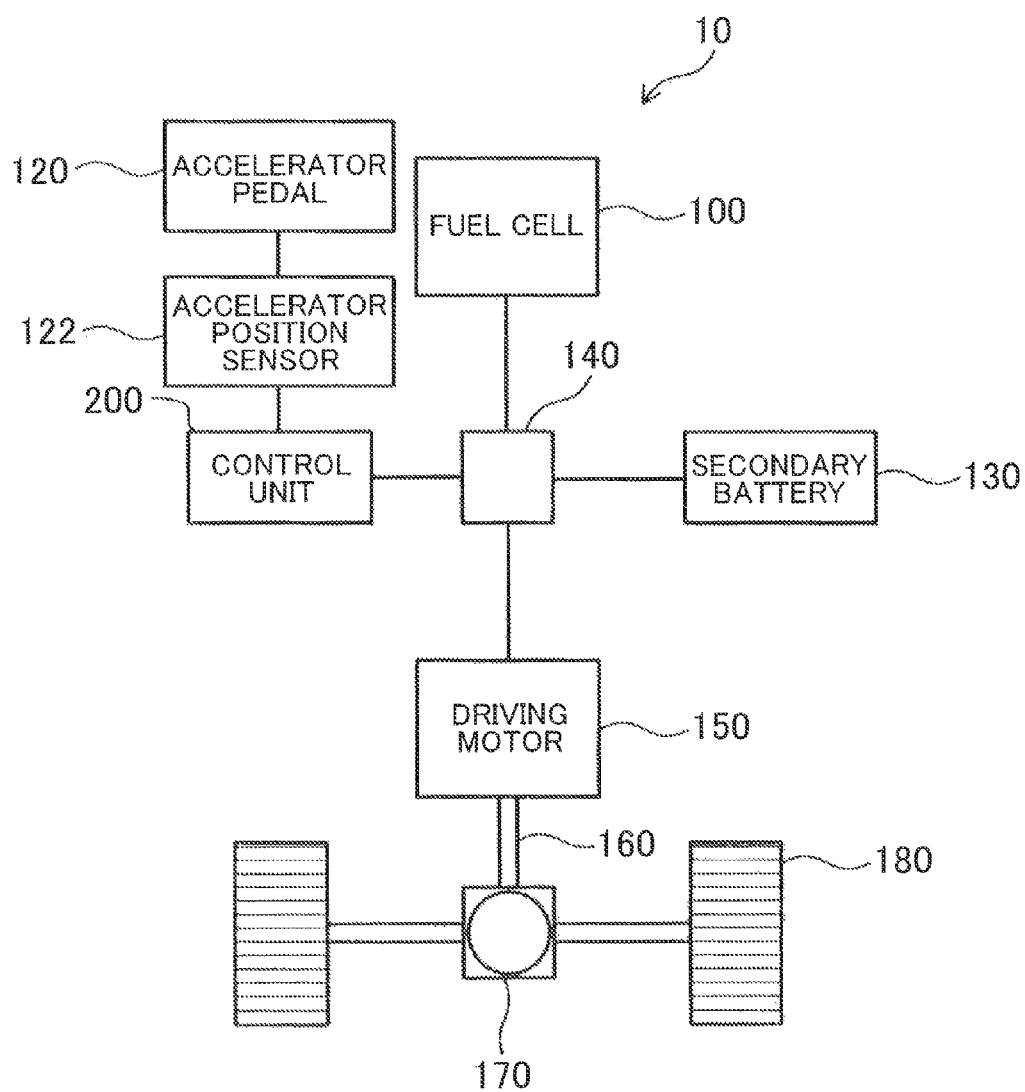
FIG. 1 is an explanatory diagram showing a fuel cell vehicle including a fuel cell.

FIG. 1 is an explanatory diagram showing a fuel cell vehicle 10 (hereinafter simply also called a "vehicle 10") including a fuel cell. The vehicle 10 includes a fuel cell 100, a control unit 200 (also called an electronic control unit (ECU)), an accelerator pedal 120 (hereinafter also called an "accelerator 120"), an accelerator position sensor 122, a secondary battery 130, a power transfer controller 140, a driving motor 150, a driving shaft 160, a power transfer gear 170, and wheels 180.

The fuel cell 100 is a power generating device in which a fuel gas and an oxidant gas electrochemically react with each other to generate electric power. The accelerator position sensor 122 detects a depressing amount (an operation amount) (called an "accelerator position") of the accelerator pedal 120 depressed by a driver. The control unit 200 calculates an amount of electric power required of a power supply apparatus (including the fuel cell 100 and the secondary battery 130) from an accelerator position detected by the accelerator position sensor 122. The control unit 200 uses the fuel cell 100 as the main power source of the vehicle, but uses the secondary battery 130 as a power source to operate the vehicle 10 when electric power generated by the fuel cell 100 is small, for example, immediately after the vehicle 10 starts. As the secondary battery 130, it is possible to employ, for example, a nickel-hydrogen battery or a lithium-ion battery. Charging of the secondary battery 130 can be performed, for example, by direct charging using electric power output from the fuel cell 100, or by converting kinetic energy of the vehicle 10 to electric energy with the use of the driving motor 150 when the vehicle 10 decelerates, and charging the secondary battery 130 with the regenerative electric power. The power transfer controller 140 controls, when receiving an instruction from the control unit 200, an amount of electric power to be supplied from the fuel cell 100 to the driving motor 150 and an amount of electric power to be supplied from the secondary battery 130 to the driving motor 150. In addition, the power transfer controller 140 supplies, when receiving an instruction from the control unit 200 at the deceleration of the vehicle 10, electric power regenerated by the driving motor 150 to the secondary battery 130. The driving motor 150 functions as a motor that operates the vehicle 10. In addition, the driving motor 150 functions as a power generator that regenerates electric power by converting the kinetic energy of the vehicle 10 to electric energy when the vehicle 10 decelerates. The driving shaft 160 is a rotary shaft that transmits a driving force generated by the driving motor 150 to the power transfer gear 170. The power transfer gear 170 transfers (distributes) the driving force to the right and left wheels 180.

Figure 2:
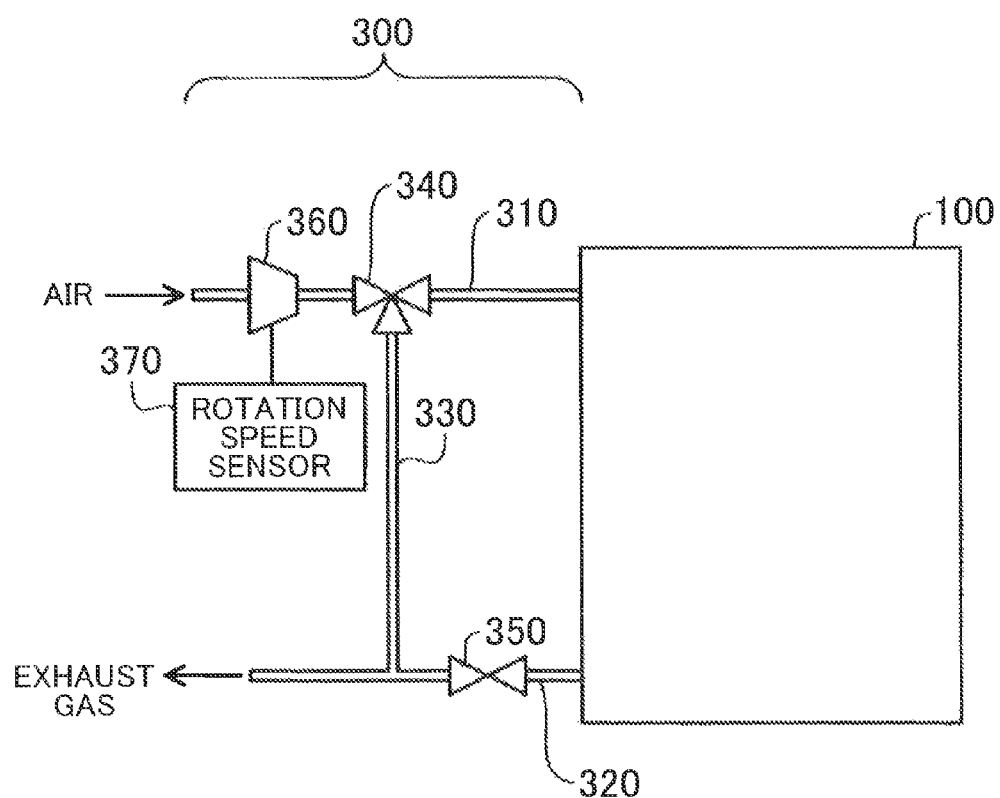
FIG. 2 is an explanatory diagram showing a fuel cell and an oxidant gas supply and discharge system.

FIG. 2 is an explanatory diagram showing the fuel cell and an oxidant gas supply and discharge system 300. A fuel cell system includes a fuel gas supply and discharge system and a cooling system in addition to the oxidant gas supply and discharge system 300. However, in the specification, only the oxidant gas supply and discharge system 300 will be described, and the descriptions of the fuel gas supply and discharge system and the cooling system will be omitted.

The oxidant gas supply and discharge system 300 includes an oxidant gas supply pipe 310, an oxidant exhaust gas discharge pipe 320, a bypass pipe 330, a flow dividing valve 340, a pressure regulation valve 350, an air compressor 360, and a rotation speed sensor 370. The oxidant gas supply pipe 310 is a pipe that supplies an oxidant gas to the fuel cell 100, and the oxidant exhaust gas discharge pipe 320 is a pipe that discharges an oxidant exhaust gas from the fuel cell 100. The bypass pipe 330 connects the oxidant gas supply pipe 310 and the oxidant exhaust gas discharge pipe 320 to each other. At the connected portion between the oxidant gas supply pipe 310 and the bypass pipe 330, the flow dividing valve 340 is provided. The flow dividing valve 340 divides an oxidant gas into an oxidant gas to be supplied to the fuel cell 100 and an oxidant gas to be supplied to the bypass pipe 330. The pressure regulation valve 350 regulates pressure of the oxidant gas in the fuel cell 100. In the embodiment, air is used as an oxidant gas. The air compressor 360 compresses and supplies air to the fuel cell 100 as an oxidant gas via the oxidant gas supply pipe 310. An air pump of another type may be used instead of the air compressor 360. The rotation speed sensor 370 obtains a rotation speed of the air compressor 360 (the number of revolutions (rotations) of the air compressor 360).

Figure 3:
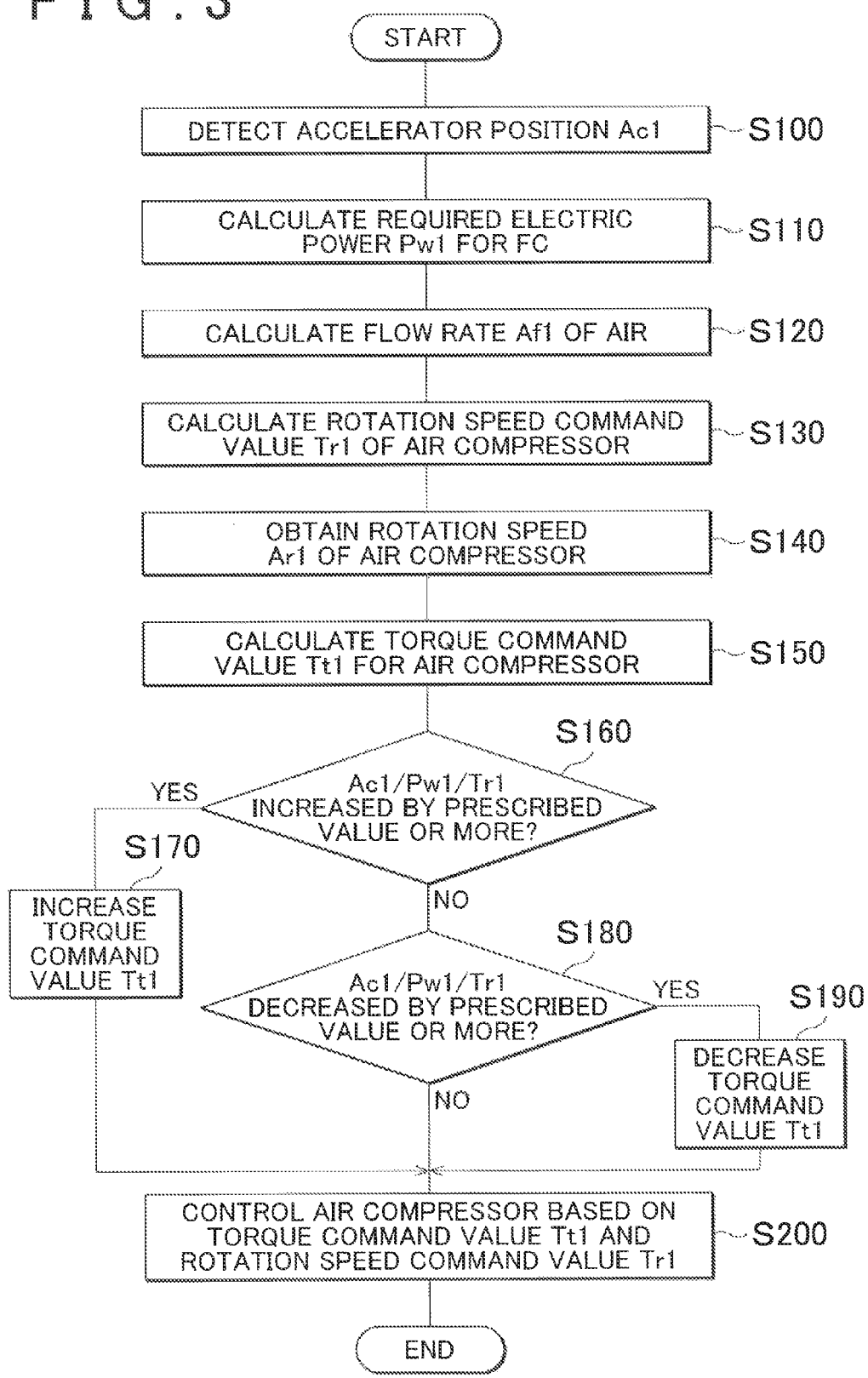
FIG. 3 is a control flowchart for an air compressor in an embodiment of the invention.

FIG. 3 is a control flow chart for the air compressor 360 in the embodiment. In step S100, the control unit 200 detects an accelerator position Ac1 from a depressing amount of the accelerator pedal 120. In step S110, the control unit 200 calculates required electric power Pw1 required of the fuel cell 100 using the accelerator position Ac1. Note that the control unit 200 may take into account electric power consumed by auxiliary machines or an air conditioning unit of the fuel cell vehicle 10 when calculating the required electric power Pw1. In step S120, the control unit 200 calculates a flow rate Af1 of air to be supplied to the fuel cell 100 in order to cause the fuel cell 100 to output the required electric power Pw1. In step S130, the control unit 200 calculates a rotation speed command value (a revolution number command value) Tr1 for the air compressor 360, which is required to supply the air at the flow rate Af1. In step S140, the control unit 200 obtains an actual rotation speed (an actual number of revolutions) Ar1 of the air compressor 360 from the rotation speed sensor 370. In step S150, the control unit 200 calculates a torque command value Tt1 for the air compressor 360 using the rotation speed command value Tr1 for the air compressor 360 and the actual rotation speed Ar1 of the air compressor 360. The torque command value Tt1 becomes a positive value when the rotation speed of the air compressor 360 is to be increased and becomes a negative value or zero when the rotation speed of the air compressor 360 is to be decreased.

In step S160, the control unit 200 determines whether at least one of the accelerator position Ac1, the required electric power Pw1, and the rotation speed command value Tr1 has been risen (increased) by a prescribed first value or more. In the embodiment, it is assumed that the accelerator position Ac1 is increased when the accelerator pedal 120 is depressed. Conversely, it is assumed that the accelerator position Ac1 is decreased when the depressed accelerator pedal 120 is released. The first value used in the determination may be set as a change amount or a change rate. In addition, the first value may be set at a different value in accordance with at least one of the values of the accelerator position Ac1, the required electric power Pw1, and the rotation speed command value Tr1 before the values are increased. The control unit 200 may include a map used to set the first value.

When determining in step S160 that at least one of the accelerator position Ac1, the required electric power Pw1, and the rotation speed command value Tr1 has been increased by the prescribed first value or more, the control unit 200 proceeds to step S170 and increases the torque command value Tt1 calculated in step S150. Here, the control unit 200 may increase the torque command value Tt1 by a different value in accordance with at least one of the values of the accelerator position Ac1, the required electric power Pw1, and the rotation speed command value Tr1 or may increase the torque command value Tt1 by a different value in accordance with at least one of the change amounts of the accelerator position Ac1, the required electric power Pw1, and the rotation speed command value Tr. After increasing the torque command value Tt1, the control unit 200 proceeds to step S200.

When determining in step S160 that none of the accelerator position Ac1, the required electric power Pw1, and the rotation speed command value Tr1 has been increased by the prescribed first value or more, the control unit 200 determines in step S180 whether at least one of the accelerator position Ac1, the required electric power Pw1, and the rotation speed command value Tr1 has been fallen (decreased) by a prescribed second value or more. Like the above case in which one of the accelerator position Ac1, the required electric power Pw1, and the rotation speed command value Tr1 is increased, the second value used in the determination may be set as a change amount or a change rate. In addition, the second value may be set at a different value in accordance with at least one of the values of the accelerator position Ac1, the required electric power Pw1, and the rotation speed command value Tr1 before the values are decreased. The control unit 200 may include a map used to set the second value.

When determining in step S180 that at least one of the accelerator position Ac1, the required electric power Pw1, and the rotation speed command value Tr1 has been decreased by the prescribed second value or more, the control unit 200 proceeds to step S190 and decreases the torque command value Tt1 calculated in step S150. When the calculated torque command value Tt1 is a negative value, the control unit 200 changes the torque command value Tt1 to a further negative value to decrease the torque command value Tt1. Here, the control unit 200 may decrease the torque command value Tt1 by a different value in accordance with at least one of the values of the accelerator position Ac1, the required electric power Pw1, and the rotation speed command value Tr1 or may decrease the torque command value Tt1 by a different value in accordance with at least one of the change amounts of the accelerator position Ac1, the required electric power Pw1, and the rotation speed command value Tr. After decreasing the torque command value Tt1, the control unit 200 proceeds to step S200.

In step S200, the control unit 200 controls the rotation speed of the air compressor 360 based on the torque command value Tt1 and the rotation speed command value Tr1 thus obtained. In the embodiment, the following advantages are produced by the processing of steps S160, S170, S180, and S190. For example, when at least one of the accelerator position Ac1, the required electric power Pw1, and the rotation speed command value Tr1 is increased by the prescribed first value or more, the control unit 200 increases in step S170 the torque command value Tt1 calculated in step S150. As a result, the rotation speed of the air compressor 360 is increased more promptly. Therefore, as compared to a case in which the torque command value Tt1 is not increased (a case without the processing of steps S160 and S170), the rotation speed of the air compressor can promptly reach the rotation speed command value Tr1. On the other hand, when at least one of the accelerator position Ac1, the required electric power Pw1, and the rotation speed command value Tr1 is decreased by the prescribed second value or more, the control unit 200 decreases the torque command value Tt1 in step S190 and thus the rotation speed of the air compressor 360 is decreased more promptly. Therefore, as compared to a case in which the torque command value Tt1 is not decreased, the rotation speed of the air compressor can promptly reach the rotation speed command value Tr1. That is, the response of the air compressor 360 can be improved.

Figure 4:
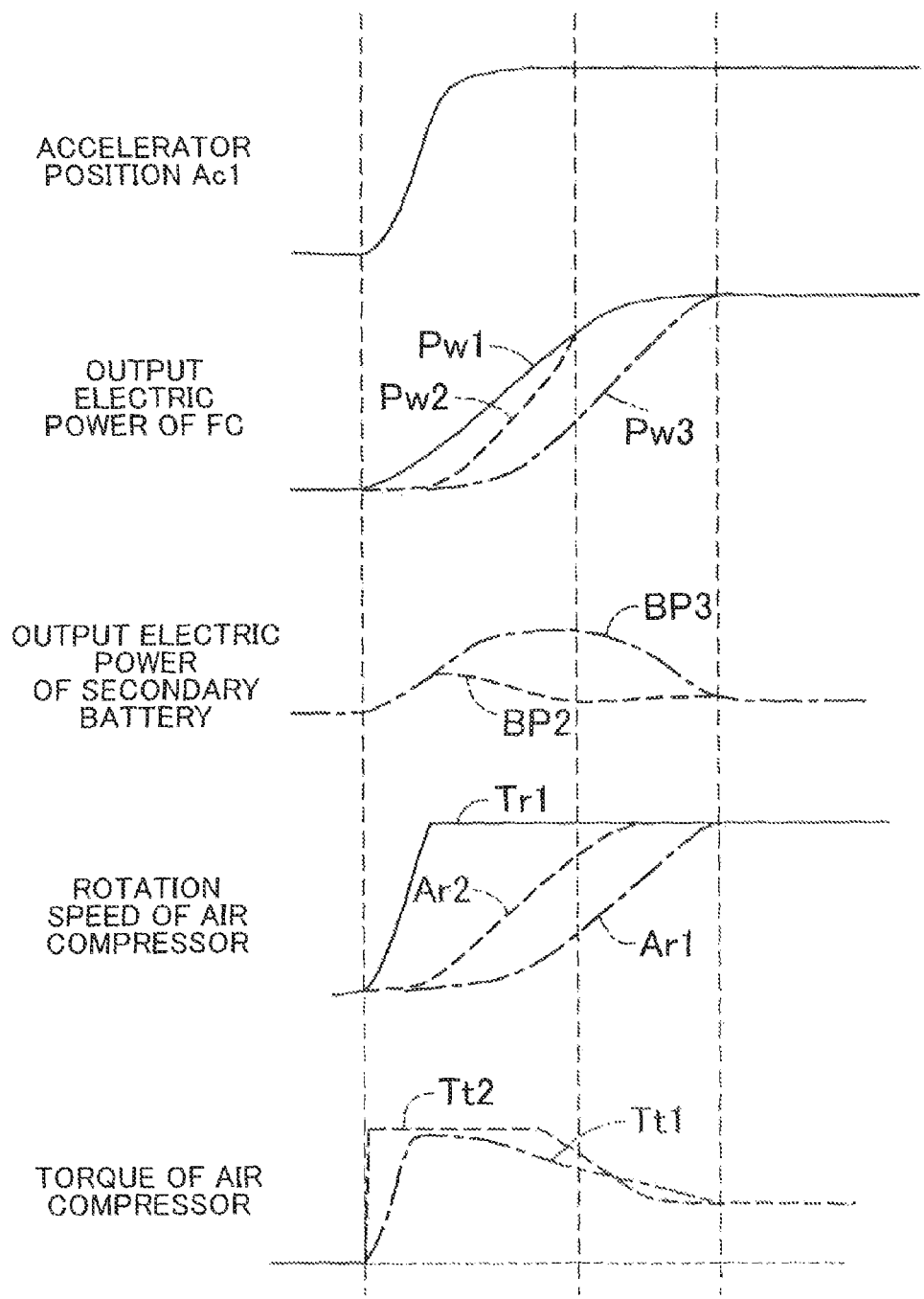
FIG. 4 is a graph showing the output of the fuel cell, the output of the secondary battery, the rotation speed of an air compressor, and the torque of the air compressor when an accelerator position is increased by a prescribed value or more.

FIG. 4 is a graph showing the output of the fuel cell, the output of the secondary battery, the rotation speed of the air compressor, and the torque of the air compressor when the accelerator position is increased by a prescribed value or more. FIG. 4 compares a case in which the torque command value Tt1 is increased in step S170 (the increased torque command value is expressed as "Tt2" for the sake of convenience) when the accelerator position Ac1 is increased by the prescribed value or more, with a case in which the torque command value Tt1 calculated in step S150 remains the same even when the accelerator position is increased by the prescribed value or more.

First, a description will be given of the case in which the torque command value Tt1 calculated in step S150 remains the same and is not changed in step S170 even when the accelerator position is increased by the prescribed value or more. When the accelerator position Ac1 is obtained, the required electric power Pw1 that is required of the fuel cell 100 is calculated. Immediately after the accelerator position Ac1 is increased, the rotation speed of the air compressor 360 is low and air required to generate the required electric power Pw1 is not supplied. Therefore, output electric power Pw3 of the fuel cell 100 is lower than the required electric power Pw1, and electric power making up for (compensating for) the shortage of the required electric power Pw1 is output from the secondary battery 130 as output electric power BP3 of the secondary battery.

The rotation speed command value Tr1 serving as a target value of the rotation speed of the air compressor 360 is increased in accordance with the required electric power Pw1. However, the rotation speed command value Tr1 is set so as not to exceed an upper limit of the rotation speed (also called an "allowable rotation speed") allowed in the air compressor 360. When the calculated rotation speed command value Tr1 exceeds the allowable rotation speed, the actual rotation speed command value Tr1 is actually limited to the allowable rotation speed. The torque command value Tt1 for the air compressor 360 is calculated from the rotation speed command value Tr1 and the actual rotation speed Ar1 of the air compressor 360. As the difference between the rotation speed command value Tr1 and the actual rotation speed Ar1 becomes larger, the torque command value Tt1 becomes larger. When a torque is given to the air compressor 360 in accordance with the torque command value Tt1, the actual rotation speed Ar1 of the air compressor 360 changes toward (becomes closer to) the rotation speed command value Tr1.

Next, a description will be given of the case in which the torque command value Tt1 is increased and turned into the torque command value Tt2 in step S170. In the embodiment, the actual rotation speed of the air compressor 360 when the torque command value is turned into Tt2 will be called a "rotation speed Ar2" for the sake of convenience. Since the increased torque command value Tt2 is larger than the calculated torque command value Tt1, the actual rotation speed Ar2 of the air compressor 360 more promptly changes toward (becomes closer to) the rotation speed command value Tr1 as compared to a case in which the calculated torque command value Tt1 is used without being changed. As a result, since an amount of air supplied to the fuel cell 100 is more promptly increased, output electric power Pw2 of the fuel cell 100 more promptly changes toward (becomes closer to) the required electric power Pw1 than the output electric power Pw3 does in a case in which the calculated torque command value Tt1 is used without being changed.

In addition, output electric power BP2 of the secondary battery 130 is smaller than output electric power BP3 of the secondary battery in a case in which the calculated torque command value Tt1 is used without being changed. Therefore, burden on the secondary battery 130 can be reduced.

As described above, in the first embodiment, the response of the rotation of the air compressor 360 is improved when the accelerator position Ac1 is increased by the prescribed value or more. As a result, the output electric power of the fuel cell 100 can more promptly changed toward the required electric power, and burden on the secondary battery 130 can be reduced.

The above-mentioned embodiment describes the case in which the accelerator position Ac1 is increased by the prescribed value or more. Here, in the embodiment, the required electric power Pw1 is calculated from the accelerator position Ac1, the flow rate Af1 of air is calculated from the required electric power Pw1, and the rotation speed command value Tr1 for the air compressor 360 is calculated from the flow rate Af1 of the air to calculate the torque command values Tt1 and Tt2 of the air compressor 360. Accordingly, the control unit 200 may increase the torque command value Tt1 when the required electric power Pw1 and/or the rotation speed command value Tr1 for the air compressor 360 is/are increased by a prescribed value or more, in addition to or instead of the accelerator position Ac1. For example, when electric power consumed by auxiliary machines or an air conditioning unit is increased, there is a possibility that the required electric power Pw1 is increased independently of the accelerator position Ac1.

Figure 5:
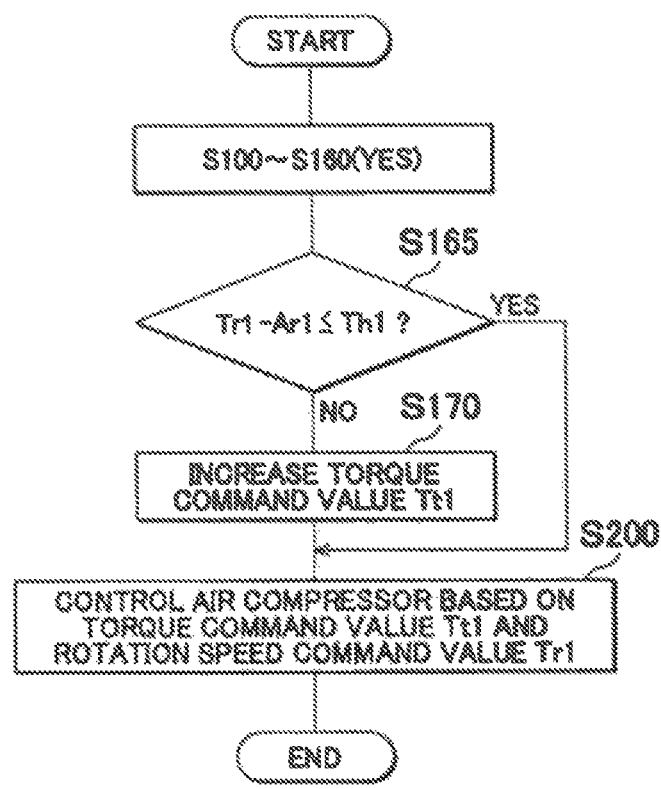
FIG. 5 is an explanatory diagram showing a modified example when the accelerator position is increased.

FIG. 5 is an explanatory diagram showing a modified example when the accelerator position is increased. The modified example is different from the first embodiment in that the control unit 200 performs the processing of step S165 prior to the processing of step S170 when determining in step S160 of FIG. 3 that at least one of the accelerator position Ac1, the required electric power Pw1, and the rotation speed command value Tr1 has been increased by the prescribed first value or more. When the difference between the actual rotation speed Ar1 and the rotation speed command value Tr1 for the air compressor 360 becomes a prescribed difference Th1 or less, the control unit 200 may proceed from step S165 to step S200 so as not to perform the processing of step S170, i.e., the control unit 200 may not increase the torque command value Tt1. In this manner, the rotation speed of the air compressor 360 can be prevented from overshooting the allowable rotation speed or the rotation speed command value Tr1. Here, the difference (TR1–Ar1) is used as a value used for the determination in step S165, but the ratio of the difference ((Tr1–Ar1)/Tr1) may be used instead.

The first embodiment describes the case in which the accelerator position Ac1 is increased by the prescribed value or more, but a second embodiment will describe a case in which the accelerator position Ac1 is decreased by a prescribed value or more.

Figure 6:
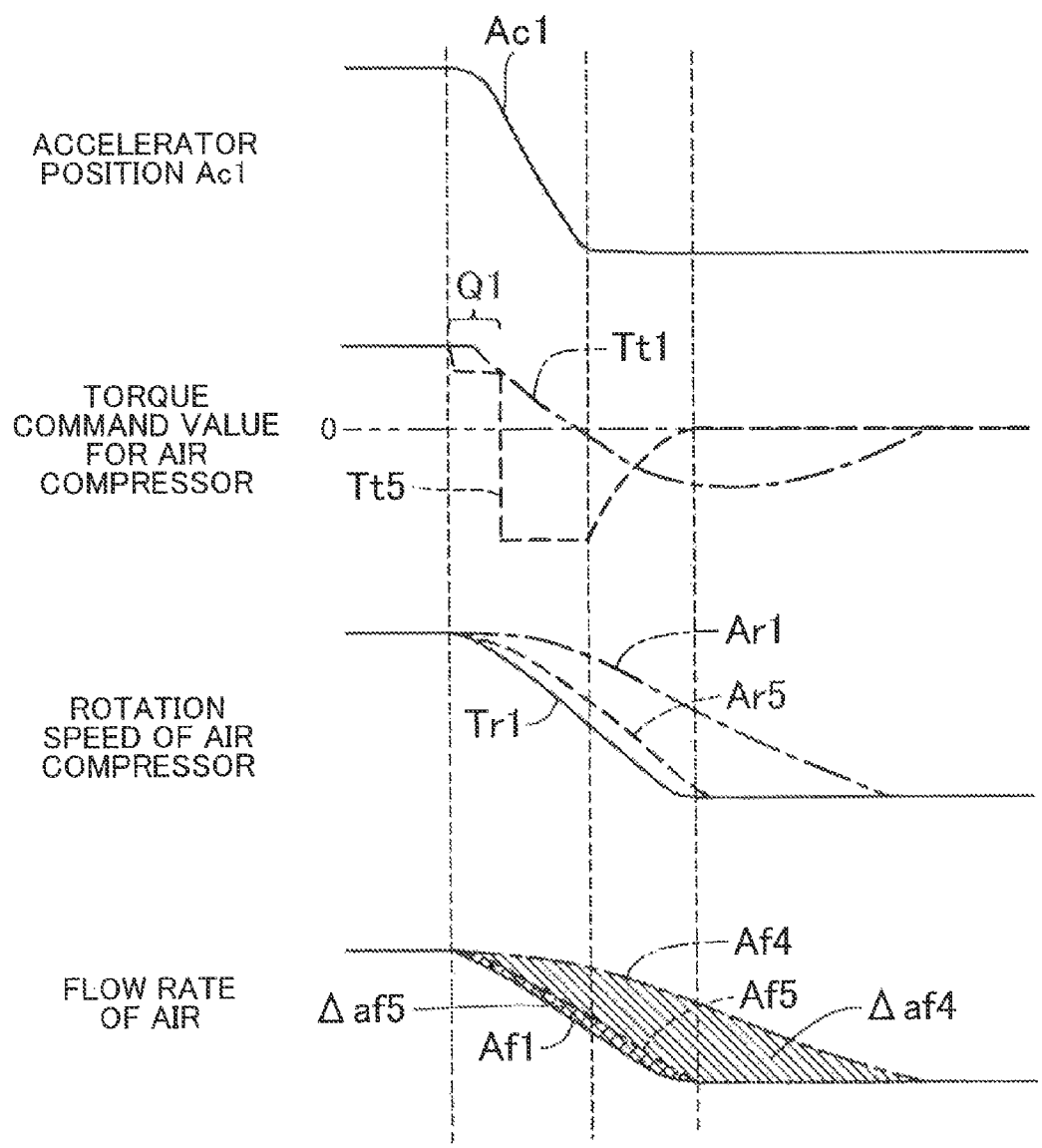
FIG. 6 is a graph showing the torque command value for the air compressor, the rotation speed of the air compressor, and the flow rate of air when the accelerator position is decreased by a prescribed value or more.

FIG. 6 is a graph showing the torque command value for the air compressor, the rotation speed of the air compressor, and the flow rate of air when the accelerator position Ac1 is decreased by the prescribed value or more. First, a description will be given of a case in which the torque command value Tt1 calculated in step S150 remains the same (the control unit 200 does not perform the processing of step S190 in FIG. 3) even when the accelerator position Ac1 is decreased by the prescribed value or more. Since the required electric power Pw1 is decreased when the accelerator position Ac1 is decreased, the flow rate Af1 of air required to generate the required electric power Pw1 is decreased, and the rotation speed command value Tr1 is also decreased. Accordingly, the control unit 200 decreases the torque command value Tt1, specifically the control unit 200 decreases the torque command value Tt1 to a negative value and sets the rotation speed command value Tr1 for the air compressor 360 at a value smaller than the actual rotation speed Ar1. Then, the control unit 200 gradually increases the torque command value Tt1 from the negative value. After that, when the actual rotation speed Ar1 of the air compressor 360 is gradually decreased to substantially match the rotation speed command value Tr1, the control unit 200 sets the torque command value Tt at zero.

In the second embodiment, when the accelerator position Ac1 is decreased and before the rotation speed command value Tr1 and the actual rotation speed Ar1 of the air compressor 360 are obtained (in a period Q1 of FIG. 6), the control unit 200 may calculate an estimated value of the rotation speed command value Tr1 from an amount of decrease in the accelerator position Ac1 (a value by which the accelerator position Ac1 is decreased), may calculate a feed-forward value of the torque of the air compressor 360 using the estimated value, and may set a value lower than the feed-forward value as the torque command value Tt1. Thus, the response of the rotation speed of the air compressor 360 can be improved. However, the control unit 200 may not perform this processing. Alternatively, the control unit 200 may perform the processing when the accelerator position Ac1 is decreased by the prescribed value or more.

After obtaining the actual rotation speed Ar1 of the air compressor 360, the control unit 200 calculates the torque command value Tt1 for the air compressor 360 according to the processing of steps S100 to S150 of FIG. 3. Note that the torque command value Tt1 is a negative value when the rotation speed of the air compressor 360 is decreased.

In the embodiment shown in FIG. 3, the control unit 200 decreases the torque command value Tt1 (the decreased torque command value is expressed as "Tt5" for the sake of convenience) according to the processing of step S190 of FIG. 3 when the accelerator position Ac1 is decreased by the prescribed value or more. As evident from FIG. 6, the decreased torque command value Tt5 is smaller than the initially calculated torque command value Tt1. Note that the torque command value has its own lower limit value to prevent the reverse rotation of the air compressor 360 and the torque command values Tt1 and Tt5 are limited so as not to be smaller than the lower limit value.

With regard to the actual rotation speed of the air compressor 360, the rotation speed Ar1 slowly changes toward (becomes closer to) the rotation speed command value Tr1 when the torque command value Tt1 is not decreased. In contrast, when the torque command value Tt1 is decreased to Tt5, the actual rotation speed Ar5 of the air compressor 360 more promptly changes toward (becomes closer to) the rotation speed command value Tr1 as compared to the case in which the torque command value Tt1 is not decreased. With regard to the flow rate of air, when the torque command value Tt1 is not decreased, a flow rate Af4 of air only slowly changes toward (becomes closer to) the flow rate Af1 at which air should be supplied to the fuel cell 100. Therefore, air corresponding to the difference Δaf4 (=Af4−Af1) between the flow rates is excessively supplied to the fuel cell 100. On the other hand, when the torque command value is decreased to Tt5, a flow rate Af5 of air promptly changes toward (becomes closer to) the flow rate Af1 at which air should be supplied to the fuel cell 100. Therefore, the difference Δaf5 (=Af5−Af1) between the flow rates corresponding to the air excessively supplied to the fuel cell 100 becomes smaller than the difference Δaf4 in the case in which the torque command value Tt1 is not decreased. As described above, when the torque command value is decreased to Tt5, the response of the air compressor 360 can be improved. In addition, since air is not excessively supplied to the fuel cell 100, the efficiency of the fuel cell 100 can be improved.

It is preferable that the output electric power of the fuel cell 100 should be prevented from becoming smaller than the required electric power Pw1. Accordingly, when the output electric power of the fuel cell 100 becomes small and becomes closer to the required electric power Pw1, the control unit 200 may set the torque command value Tt5 for the air compressor 360 at zero. For example, when the difference between the output electric power and the required electric power Pw1 becomes smaller than a prescribed threshold, the control unit 200 may set the torque command value Tt5 such that the torque command value Tt5 gradually becomes closer to zero.

In the second embodiment, as described above, when the accelerator position Ac1 is decreased by the prescribed value or more, the torque command value Tt1 is decreased to improve the response of the rotation of the air compressor 360. As a result, the efficiency of the fuel cell 100 can be improved.

Note that like the first embodiment, the control unit 200 may stop decreasing the torque command value Tt1 when the rotation speed (the revolution number) of the air compressor 360 reaches a rotation speed (a revolution number) higher than the rotation speed command value (the revolution number command value) Tr1 by a prescribed rotation speed (by a prescribed value). In this manner, it is possible to prevent undershooting of the rotation speed of the air compressor (it is possible to prevent the rotation speed of the air compressor from becoming lower than the rotation speed command value Tr1).

In addition, when the accelerator position Ac1 is decreased and before the rotation speed command value Tr1 and the actual rotation speed Ar1 of the air compressor 360 are obtained, for example, immediately after the accelerator position Ac1 is decreased (for example, in the period Q1 of FIG. 6), the control unit 200 may calculate an estimated value of the rotation speed command value Tr1 from an amount of decrease in the accelerator position Ac1 (a value by which the accelerator position Ac1 is decreased), may calculate a feed-forward value of the torque of the air compressor 360 using the estimated value, and may set a value lower than the feed-forward value as the torque command value Tt1. In this case, when the accelerator position Ac1 is decreased, the control unit 200 can calculate the torque command value Tt1 without acquiring the actual rotation speed of the air compressor 360. Therefore, the response of the rotation speed of the air compressor 360 can be improved.

Moreover, the control unit 200 may set a lower limit value of the torque command value Tt1 in accordance with the rotation speed of the air compressor 360. The torque command value Tt1 becomes a negative value when the rotation speed of the air compressor 360 is decreased. Although there is a possibility that the air compressor 360 reversely rotates when the negative value is large, the reverse rotation of the air compressor 360 can be prevented by setting the lower limit value of the torque command value Tt1.

Figure 7:
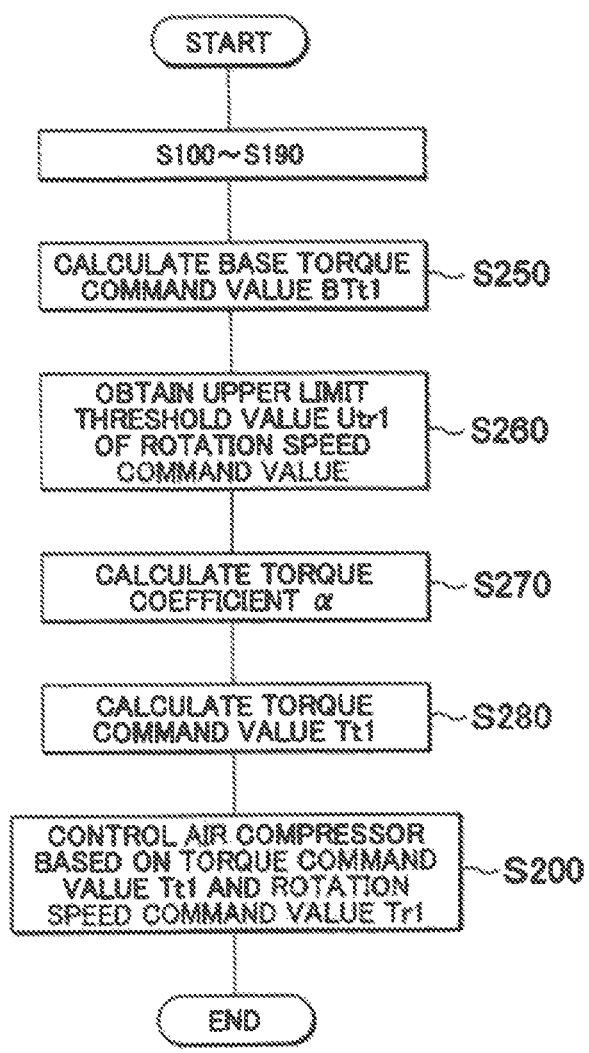
FIG. 7 is an explanatory diagram showing a control flowchart in a third embodiment.

FIG. 7 is an explanatory diagram showing a control flowchart in a third embodiment. The third embodiment is different from the first embodiment shown in FIG. 3 in that the third embodiment includes the processing of steps S250, S260, S270, and S280.

In step S250, the control unit 200 calculates a base torque command value BTt1. The base torque command value BTt1 is the same as the torque command value Tt1 calculated in step S150 of the first embodiment (FIG. 3). In step S260, the control unit 200 obtains an upper limit threshold value Utr1 of the rotation speed command value Tr1 for the air compressor 360. The upper limit threshold value Utr1 is a value smaller than the allowable rotation speed of the air compressor 360. The control unit 200 may obtain the upper limit threshold value Utr1 by reading the upper limit threshold value Utr1 stored in advance in a non-volatile storage unit (not shown) or by calculating the upper limit threshold value Utr1 based on the base torque command value BTt1.

In step S270, when the actual rotation speed Ar1 of the air compressor 360 exceeds the upper limit threshold value Utr1, the control unit 200 calculates a torque coefficient α from the difference (Ar1−Utr1) between the upper limit threshold value Utr1 and the actual rotation speed Ar1 of the air compressor 360. The maximum value of the torque coefficient α is 1, and the torque coefficient α becomes smaller as the difference (Ar1−Utr1) between the upper limit threshold value Utr1 and the actual rotation speed Ar1 of the air compressor 360 becomes larger. The value of the torque coefficient α is calculated using, for example, a preset map showing the relationship between the torque coefficient α and the difference (Ar1−Utr1). In step S280, the control unit 200 multiplies the base torque command value BTt1 by the torque coefficient α to calculate a new torque command value Tt1. The control unit 200 performs the control (the processing) of the following steps S160, S170, and S200 using the new torque command value Tt1.

Note that the control unit 200 may calculate the torque coefficient α based on a rotation speed peak value (a revolution number peak value) rp. The rotation speed peak value rp is the measurement value Ar1 of a rotation speed exceeding the rotation speed command value Tr1. The rotation speed peak value rp is increased when the measurement value Ar1 is increased. However, when the measurement value is decreased, the control unit 200 may calculate an estimated rotation speed peak value rp1 with the assumption that the rotation speed peak value rp is to be decreased by a certain amount in a certain period of time, and may calculate the torque coefficient α using a larger one of the estimated rotation speed peak value rp1 and the new measurement value Ar1 as a new rotation speed peak value rp. In addition, the control unit 200 may calculate the torque coefficient α from the absolute value of the rotation speed peak value or may calculate the torque coefficient α from the difference between the rotation speed peak value and the initial upper limit threshold value Utr1.

Figure 8:
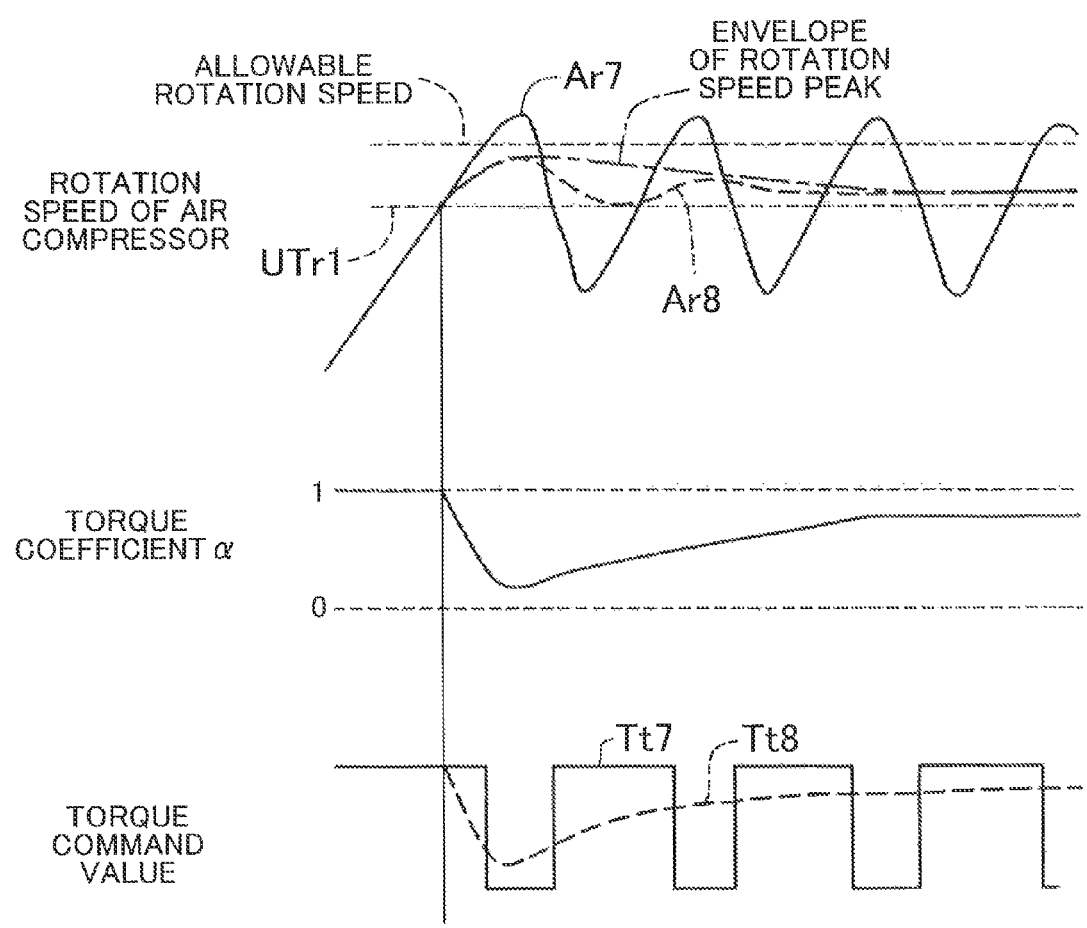
FIG. 8 is a graph showing the rotation speed of the air compressor, and the torque coefficient and the torque command value for the air compressor in the third embodiment.

FIG. 8 is a graph showing the rotation speed of the air compressor, and the torque coefficient and the torque command value for the air compressor in the third embodiment. First, a description will be given of a case in which the control unit 200 does not perform the control of the third embodiment, i.e., a case in which the control unit 200 does not multiply a torque command value by a torque coefficient. When a torque command value Tt7 is increased with an increase in the accelerator position Ac1, a rotation speed Ar7 of the air compressor 360 is increased. The rotation speed of the air compressor 360 and the torque command value for the air compressor 360 in the case in which the control unit 200 does not perform the control of the third embodiment will be called the rotation speed Ar7 and the torque command value Tt7, respectively, for the sake of convenience. The rotation speed of the air compressor 360 and the torque command value for the air compressor 360 in a case in which the control unit 200 performs the control of the third embodiment will be called a rotation speed Ar8 and a torque command value Tt8, respectively, for the sake of convenience. When the actual rotation speed Ar7 of the air compressor exceeds the allowable rotation speed, the control unit 200 sets the torque command value Tt7 at zero to decrease the rotation speed of the air compressor 360. However, the response of the rotation speed Ar7 of the air compressor 360 to the torque command value Tt7 is poor (low). Therefore, even when the control unit 200 sets the torque command value Tt7 at zero, the rotation speed Ar7 of the air compressor 360 is increased for a while and then decreased. Note that when the control unit 200 sets the torque command value Tt7 at zero, a torque is used to compress air with the air compressor 360, and therefore, the rotation speed Ar7 of the air compressor 360 is decreased instead of being maintained. When the actual rotation speed Ar7 of the air compressor 360 becomes lower than the upper limit threshold value Utr1, the control unit 200 changes the torque command value Tt7 from zero to the initial torque command value Tt7 to increase the rotation speed Ar7 of the air compressor 360. In this case, the torque command value is alternately set at the value Tt7 and zero (i.e., the torque command value is changed between the value Tt7 and zero), and the rotation speed Ar7 of the air compressor 360 is also repeatedly increased and decreased. That is, there is a possibility that hunting occurs.

In the third embodiment, when the actual rotation speed Ar8 of the air compressor 360 exceeds the upper limit threshold value Utr1, the control unit 200 calculates a torque coefficient α based on the difference (Ar8−Utr1) between the actual rotation speed Ar8 of the air compressor and the upper limit threshold value Utr1. The torque coefficient α is equal to or less than 1, and becomes smaller as the difference (Ar8−Utr1) becomes larger. Then, the control unit 200 multiplies the base torque command value BTt1 by the torque coefficient α to calculate the torque command value Tt8. That is, the torque command value Tt8 becomes smaller as an amount, by which the actual rotation speed (the actual revolution number) Ar8 of the air compressor exceeds the upper limit threshold value Utr1, becomes larger. Therefore, the actual rotation speed of the air compressor hardly exceeds the allowable rotation speed. In addition, when the actual rotation speed Ar8 of the air compressor 360 is decreased and becomes closer to the upper limit threshold value Utr1, the torque command value becomes large. Therefore, the rotation speed Ar8 of the air compressor 360 gradually (smoothly) becomes closer to the upper limit threshold value Utr1, and thus hunting hardly occurs.

In the third embodiment, when the actual rotation speed Ar8 of the air compressor 360 exceeds the upper limit threshold value Utr1, the torque command value Tt8 becomes small with a decrease in the torque coefficient α. As a result, hunting of the rotation speed of the air compressor 360 and the torque command value for the air compressor 360 can be prevented. Note that in the third embodiment, the control unit 200 may not perform the processing (i) in which the torque command value Tt1 used to control the air compressor 360 is set to be larger than the calculated torque command value Tt1 to control the rotation speed of the air compressor 360 when at least one of values of the accelerator position Ac1, the required electric power Pw1, and the rotation speed command value Tr1 or a change rate of at least one of the values is increased by a prescribed first value or more, and the processing (ii) in which the torque command value Tt1 used to control the air compressor 360 is set to be smaller than the calculated torque command value Tt1 to control the rotation speed of the air compressor 360 when at least one of the values of the accelerator position Ac1, the required electric power Pw1, and the rotation speed command value Tr1 or a change rate of at least one of the values is decreased by a prescribed second value or more.

The embodiments of the invention are described above based on some examples. However, the above-mentioned embodiments of the invention are described to facilitate the understanding of the invention and do not limit the invention. The embodiments of the invention may be changed or modified without departing from the scope of the invention, and the invention includes its equivalents.

What is claimed is:

1. A vehicle including a fuel cell system, comprising:
   a fuel cell;
   an air pump that supplies an oxidant gas to the fuel cell;
   an accelerator position sensor that detects an accelerator position of the vehicle; and
   an electronic control unit configured to control the fuel cell system, the electronic control unit being configured to perform first processing in which required electric power is calculated from the accelerator position detected by the accelerator position sensor, a flow rate of the oxidant gas to be supplied to the fuel cell is calculated in accordance with the required electric power, a rotation speed command value for the air pump is calculated using a value of the calculated flow rate, a torque command value for the air pump is calculated using the rotation speed command value and a current rotation speed of the air pump, and the rotation speed of the air pump is controlled based on the torque command value and the rotation speed command value, and
   the electronic control unit being configured to perform, in the first processing, at least one of
      second processing in which the torque command value used to control the air pump is set to be larger than the calculated torque command value to control the rotation speed of the air pump when at least one of values of the accelerator position, the required electric power, and the rotation speed command value or a change rate of at least one of the values is increased by a prescribed first value or more, and
      third processing in which the torque command value used to control the air pump is set to be smaller than the calculated torque command value to control the rotation speed of the air pump when at least one of the values of the accelerator position, the required electric power, and the rotation speed command value or the change rate of at least one of the values is decreased by a prescribed second value or more,
   wherein the electronic control unit is configured to perform the first processing without performing the second processing when an actual rotation speed of the air pump reaches a rotation speed lower than the rotation speed command value by a prescribed first rotation speed in the second processing, and to perform the first processing without performing the third processing when the actual rotation speed of the air pump reaches a rotation speed higher than the rotation speed command value by a prescribed second rotation speed in the third processing.

2. The vehicle according to claim 1, wherein the electronic control unit is configured to calculate an estimated value of the rotation speed command value from an amount of decrease in the accelerator position, to calculate a feed-forward value of a torque of the air pump using the estimated value, and to set a value lower than the feed-forward value as the torque command value, when the accelerator position is decreased and before the rotation speed command value for the air pump is obtained in the third processing.

3. The vehicle according to claim 1, wherein the electronic control unit is configured to decrease a torque of the air pump by a prescribed value from a feed-forward value of the torque of the air pump in the third processing, the feed forward value being calculated based on an amount of decrease in the accelerator position.

4. The vehicle according to claim 1, wherein the electronic control unit is configured to set a lower limit value of the torque command value in accordance with an actual rotation speed of the air pump.

5. The vehicle according to claim 1, wherein the electronic control unit is configured to set the torque command value at zero when the accelerator position is decreased and the required electric power that is required of the fuel cell and that is calculated from the accelerator position is larger than output electric power of the fuel cell.

6. The vehicle according to claim 1, wherein the electronic control unit is configured to perform the first processing without performing the third processing when the accelerator position is decreased and the required electric power that is required of the fuel cell and that is calculated from the accelerator position is larger than output electric power of the fuel cell.

7. The vehicle according to claim 1, wherein:
   an upper limit threshold value of the rotation speed command value is provided, the upper limit threshold value being smaller than an allowable rotation speed of the air pump; and
   the electronic control unit is configured, when the rotation speed of the air pump exceeds the upper limit threshold value during the first processing, to calculate a torque coefficient based on a difference between an actual rotation speed of the air pump and the upper limit threshold value, to use the torque command value calculated in the first processing as a base torque command value, to multiply the base torque command value by the torque coefficient to calculate a new torque command value, and to control the rotation speed of the air pump based on the new torque command value and the rotation speed command value, the torque coefficient being equal to or less than 1 and becoming smaller as the difference becomes larger.

* * * * *